May 4, 1954
G. V. A. DUCH ET AL
2,677,746
MACHINE FOR BUTT-WELDING OR END-SHAPING CABLES
OR THE LIKE AND ITS METHOD OF UTILIZATION
Filed Dec. 26, 1950
2 Sheets-Sheet 1
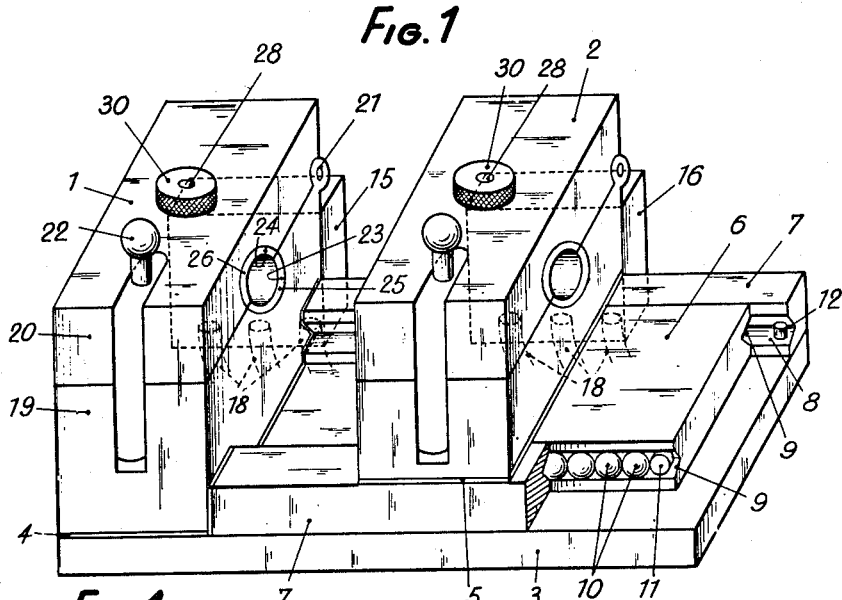
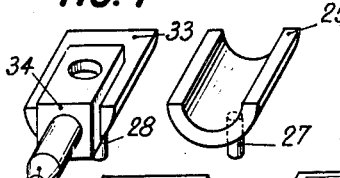
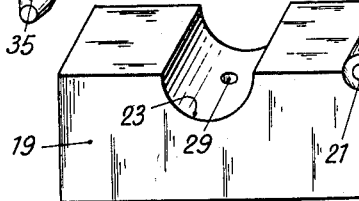
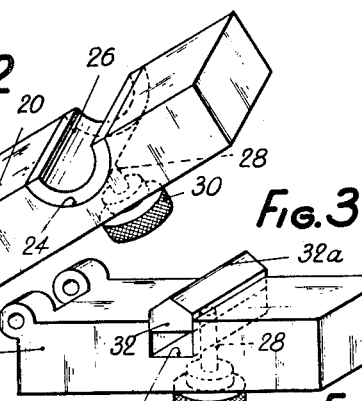
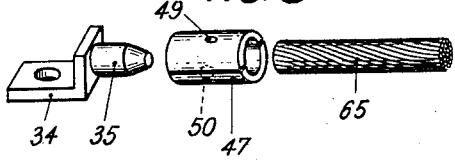
Inventors
Gabriel V. A. Duch &
Marie A. Duch born Bernelin
By Young, Emery & Thompson
Attys.

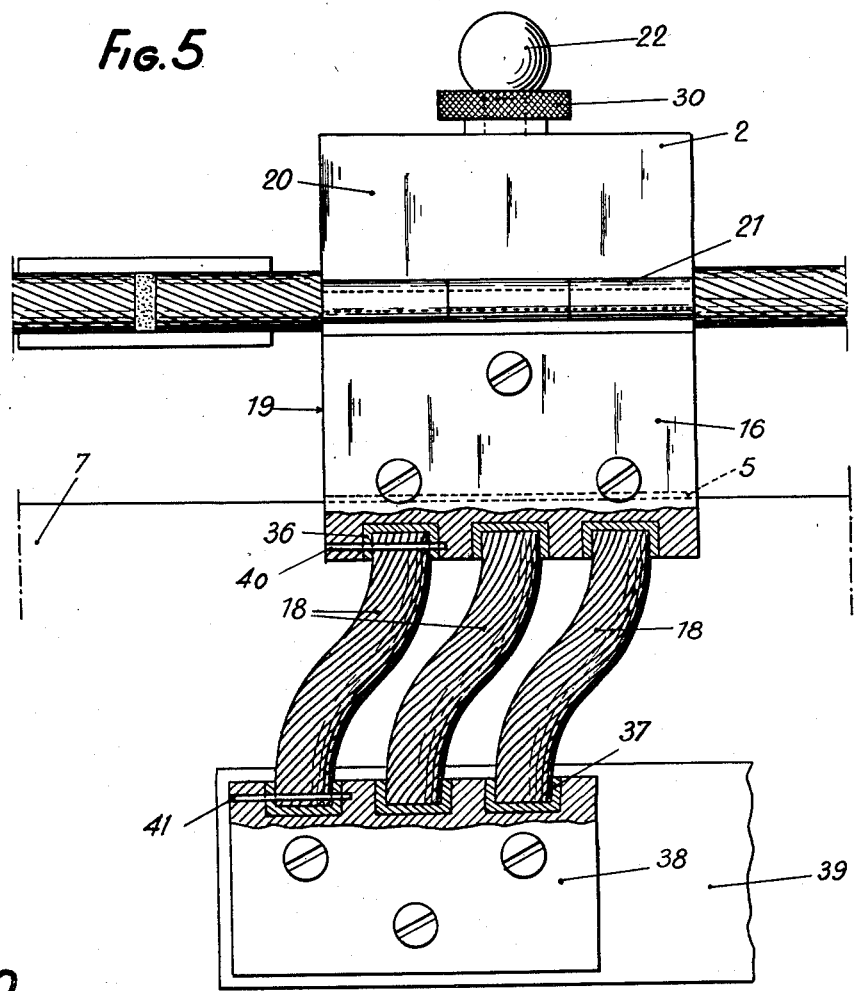
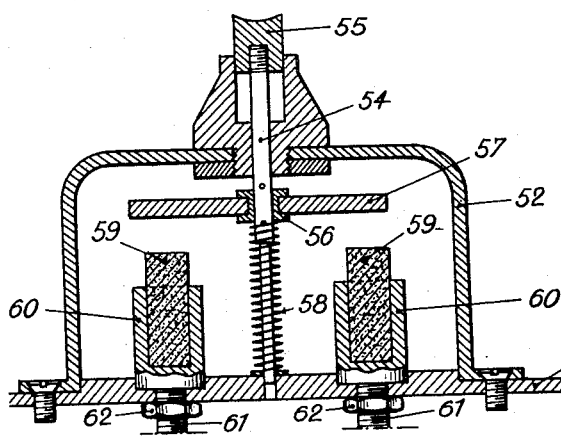

Patented May 4, 1954

2,677,746

UNITED STATES PATENT OFFICE 2,677,746

MACHINE FOR BUTT-WELDING OR END-SHAPING CABLES OR THE LIKE AND ITS METHOD OF UTILIZATION

Gabriel Victor Alphonse Duch and Marie Adrienne Duch, née Bernelin, Lyons, France Application December 26, 1950, Serial No. 202,586

Claims priority, application France December 30, 1949

7 Claims. (Cl. 219—10)

The present invention relates to a machine for butt-welding, end-shaping or cutting off leads, cables, tubes or like articles by a prolonged heating action and to a method for welding and shaping such articles by this machine.

Machines for some of these purposes have already been proposed. Some of them include a pair of jaws adapted to receive the extreme ends of the conductors, cables or other articles to be welded or cut off, at least one of these jaws being movable so as to permit the two jaws to be moved toward each other and consequently the metal fused by the flow of electric current between the lengths of conductors or cables to be swaged. In such machines, the closing of the heating circuit for fusing the metal is obtained by providing a switch in the circuit of the primary winding of a transformer whose secondary winding supplies a high intensity current to the jaws in which the ends of the conductor or cable lengths to be welded or cut off are clamped. Moreover, when dealing for example with a copper-aluminum or aluminum-aluminum weld, it is known to shroud the welded zone from the atmosphere by means of a protecting sleeve which may afterwards either be left on the welded zone or disengaged therefrom. The swaging action exerted upon the lengths of cables or conductors incidental to the fusing of the metal permits the fused portion to be joined together in the protecting sleeve.

Owing to the high intensity of the current used for welding and in order to prevent the metal from burning, the duration of current flow is generally held at a low value which moreover entails the provision of relatively intricate contrivances the use and maintenance of which must be taken care of by skilled labor.

It is an object of the invention to improve machines of this type and to provide a universal machine adapted for electrically butt-welding or cutting off, as well as for end-shaping cables, conductors or like elements in refractory molds of suitable shape provided with an aperture or vent for the escape of fused metal in excess and capable of being broken off when the operation is performed or alternatively dismantled with a view to being re-used. The elements may be then cut off flush with the mold, if necessary, and trimmed.

Another object of the invention is to provide a machine as aforesaid permitting mechanically resisting butt-weldings to be effected, for instance, copper-aluminum, copper-copper, aluminum-aluminum, steel-steel, with welding times ranging from one second to several minutes, i. e. much longer than the usual welding durations, and consequently enabling the operator directly to establish the welding contact, the end of the welding action being indicated for example by the limitation of the return amplitude when the fusing action is being performed, or by the ejection of fused metal through an aperture or vent provided in the protecting sleeve (which may be made of carbon or carburetted refractory material or molten alumina or silica for copper-copper or aluminum-aluminum weldings, or of non-carburetted refractory material for steel-steel weldings, or of metallic material for copper-aluminum weldings).

A further object of the invention is to provide a machine generally comprising two jaws for receiving the extreme ends of the conductors or cables to be welded or end-shaped or alternatively cut off, said jaws being fed by the secondary winding of a transformer in the primary circuit of which a contactor is interposed and which is fed by a suitable source of current, this machine being characterized by the fact that at least one of the jaws is mounted on a carriage guided along a base plate with interposed bearing or rolling means advantageously constituted by balls housed in grooves provided both in the carriage and in the base plate, said jaw or jaws being electrically insulated from said base plate. Thanks to this arrangement, quite an appreciable relative displacement of the jaws is obtained, owing to which the welding operation is facilitated.

According to other features of the invention, each jaw is made up of a base element and a cover element, both elements being hingedly connected and advantageously tightened by means of an eccentric as known in the art, and is provided with semi-cylindrical recesses in which semi-cylindrical bushings, made of a very conductive metal, such as copper, are housed, said bushings being provided on their outer face with centering studs engageable into holes provided in the semi-cylindrical recesses. Several series or sets of semi-cylindrical bushings having different inner diameters are provided for matching conductors of different diameters and ensuring proper contact.

According to other features still of the invention, the fusing or smelting current fed by the secondary winding of the transformer is supplied by flexible leads the diameters of which are suited to the necessary current intensity. The free ends of these leads are welded with a fusible metal or alloy in recesses provided in the jaws or to contact terminals which must be applied in perfect face contact on the jaws and to the ends of the transformer secondary winding. Thus, the advantage of mercury cup contactors as used in laboratories may be preserved by utilizing for the welding operation a metal having a much lower melting point than the melting point of the metal of which the conductors or cables clamped between the jaws are made.

However, this contact may also be obtained by means of copper lugs fitted to the end of the flexible connecting cables and secured to the jaws and to the secondary winding of the transformer. It will be observed that the homogeneous and agglomerating welding of the cable end strands may be effected by means of the machine according to the invention by utilizing, if necessary, a protecting sleeve provided in its middle portion (corresponding to the welding zone) with an aperture or vent for the ejection of the burned metal that can be released from the cable when welding is performed, the agglomerated material in excess being then sawn off.

The invention also relates to connecting cables manufacturable according to the method herein described that can be keyed by their bunched end portion in the recess where it has been welded with easily melting solder.

According to further features still of the invention, the contactor which is inserted in the primary circuit of the transformer is constituted by a contact disc or leaf made of high conductive metal which can be brought into contact with two graphite-copper masses, an elastic member normally forcing back this contact disc or leaf into inoperative position, away from these graphite-copper masses.

A further object of the invention is to provide a method for butt-welding metal lugs, including an angle member and a stump, to the ends of metallic cables, conductors, tubes and the like by the novel use of a universal machine as aforesaid, including relatively movable jaws containing interchangeable half bushings and a solid semi-cylindrical element for securing the angle member of the lug, said method comprising the steps of fixing the lug and cable or conductor in the jaws of the machine, the end portion of the lug being directed toward this conductor while adapting one end of a protecting sleeve upon the end of the cable, engaging the end portion of the lug into the other end of the jaw, and causing a welding current to flow through the jaws while driving back the jaws toward each other.

With these and such other objects in view as will incidentally appear hereafter, the invention comprises the novel construction and combination of parts that will now be described with reference to the accompanying drawings exemplifying the same and forming a part of the present disclosure.

Fig. 1 is a perspective part view of a machine according to the invention showing the arrangement of the jaws.

Fig. 2 is a perspective partial view of a jaw, assuming, for the sake of clearness, one of the semi-cylindrical bushings to be disengaged from its housing, the locking eccentric being omitted.

Fig. 3 is a perspective view of the cover element of an alternative form of a jaw.

Fig. 4 is a perspective view of an alternative form of a lower semi-cylindrical bushing.

Fig. 5 is an elevational view (taken from the hinge side) showing how the terminals are fixed upon the base elements.

Figs. 6 to 9 show two welding methods for the contact lugs on electrotechnical connecting cables.

Fig. 10 is an elevational sectional view of a contactor of the type utilized on the machine according to the invention.

Referring first to Fig. 1, the jaws 1, 2 utilized in a manner known per se to clamp the end portions of the conductors or cables to be butt-welded, end-shaped or cut off are mounted on a base plate 3. The jaw 1 is stationary on this base plate from which it is insulated by means of a leaf of suitable insulating material 4, while the jaw 2 is mounted, with an interposed leaf 5, on a carriage 6 movable on the base plate 3. The base plate has side rails 7 provided with innerly facing side grooves 8 which cooperate with side grooves 9 on the carriage 6 so as to constitute a housing or race for rolling balls 10. Abutments 11, 12 are provided at the ends of these grooves 8 for preventing the balls 10 from escaping and limiting the stroke of the carriage 6. In order to make fig. 1 clearer, only a part of the rails 7 of the base plate 3 has been shown. Thus a perfect relative mobility of the jaws is obtained.

Against the rear part of each jaw is closely applied a contact terminal 15, 16 for fixing thereto the end portions of the flexible connecting cables 18, as will be indicated hereinafter in detail.

As shown in Figs. 1 and 2, each jaw 1, 2 comprises a base element 19 and a cover element 20, hingedly connected together by a pin 21 and capable of being tightly applied to each other by means of an eccentric lever 22. The base element 19 and the cover element 20 of the jaws are provided with semi-cylindrical recesses 23, 24 for receiving semi-cylindrical bushings 25, 26 provided on their outer faces with centering studs 27, 28. The stud 27 of the semi-cylindrical bushing 25 fitted in the base element 19 engages a blind hole 29 provided therein, while the stud 28 of the opposite bushing 26 has a screwthread and projects beyond the cover element 20 for receiving a knurled locking nut 30.

According to a feature of the invention, provision is made of a series or set of semi-cylindrical bushings of different inner diameters to match cables or conductors of different diameters thereby ensuring perfect contact for the flow of an electric current of high intensity.

In the alternative form shown in Fig. 3, the upper or cover element 20 is provided with a transverse recess 31 of rectangular cross section for receiving a locking prism 32 which, once the cover is brought into closed position over the conductor to be welded and housed in the opposite semi-cylindrical bushing 25, firmly applies said conductor onto the bottom of said semi-cylindrical bushing 25 by means of its edge 32a, thereby preventing any sliding motion. The prism 32 is held in the cover element 20 by means of a screwthreaded stud 28 and a knurled nut 30 as in the previous case.

In Fig. 4 is shown an alternative form utilizable for welding copper end lugs and comprising a full half bushing 33 of generally semi-cylindrical shape and having a plane outer face onto which the extreme angle part 34 of the lug may be applied, the stump 35 of which is to be butt-welded to a cable. In this case, a satisfactory setting of this lug 34, 35 for the welding operation is obtained by utilizing a cover element 20 of the type shown in Fig. 3.

As shown by way of non-limitative example in Figs. 1 and 5, the welding current is supplied to the jaws 1, 2 through the rear part of the same, on the terminals 15, 16. For this purpose, recesses 36 are provided in these terminals 15, 16 and in the flanges of the jaws 1, 2 while further recesses 37 are provided in a terminal 38 secured on the end portion of the secondary winding of the transformer 39 for welding current supply. In these recesses 36, 37 are engaged the end portions of the flexible cable 18 of large section, which are sufficient for a current flow of the desired intensity. These end portions may be bunched by butt-welding and are sunk within a fusible metal or alloy which fills the recesses by means of which they are welded. This alloy thus ensures a satisfactory electrical contact whatever the welding temperature may be. Preferably, the terminals 15, 16, 38 are secured on flanges or associated elements to prevent any disengagement of the connecting cables 18 when being tightened. While three connecting cables 18 associated to the jaw 2 are shown on the drawings, it is obvious that this number may be varied according to requirements. As shown at 40, 41, one of the cables 18 is keyed at each of its ends.

In Figs. 6 and 7 is illustrated a butt-welding method for copper or copper alloy lugs for the fixing of aluminum electrotechnical cables 64, this welding operation being for instance carried out by means of the semi-cylindrical bushings shown in Fig. 4. In this case, as shown in Fig. 6, the stump 35 of the copper or copper alloy lug 34 which has been previously slit by several saw cuts for facilitating penetration of the molten metal, is engaged into the end portion of a protecting sleeve 44, made for example of copper or copper alloy, which contains an extraneous metal disc 45 made of tin or tin alloy. The copper or aluminum cable 64—65 is engaged into the other end of the sleeve 44, whereupon these elements are fixed into the jaws of the machine, according to a welding method known per se, to perform the welding operation. In Fig. 7 is shown the cable 64 fitted with its end lug 34 after the welding operation has been performed.

In the constructional form shown in Fig. 8 for butt-welding copper or copper alloy lugs to electrotechnical copper cable ends, a protecting sleeve 47 made of carburetted keramic or other carburetted refractory material or of carbon and made up of two halves which are assembled by suitable means (not shown) is used which has, in its middle portion, an aperture or vent for the escape of the molten metal. This aperture or vent 49 may be provided either in one of the two halves of the sleeve 47 or on the junction line of both halves, as shown in dotted line at 50. During the welding operation, the molten metal is forced through the aperture 49 and forms a bead 51, the appearance of which indicates the end of the welding action, and which solidifies while cooling (Fig. 9). When the welding operation is performed, the two halves of the sleeve 47 are segregated so as to free the solid welded zone 48. If desired, the bead 51 formed by the ejected metal, may be cut off. If a full sleeve has been used and slidden over two cable ends to be welded, it may be cut off afterwards.

In Fig. 10 is shown a switch that may be used in the primary circuit of the transformer for the welding current supply. This switch comprises a housing 52, screwed on an insulating base plate 53 and is provided with an aperture for receiving a spindle 54 carrying at its free end a knob 55 and having about its middle portion an insulating collar 56 in which is secured a contact disc 57 made of copper. This spindle 54 is guided at its lower end in the base plate 53 and is encompassed by a helical spring 58 interposed between the base plate 53 and the collar 56 which normally urges the spindle 54 upwards. Below the disc 57, at some distance from the same, are arranged graphite-copper masses 59 (made of graphite-copper conglomerate or of any other conductive and breakable conglomerate or alloy) housed in sockets 60 which carry a screwthreaded bar 61 for connecting the conductors (not shown) and secured in position by nuts 62. The combination of copper and graphite-copper permits a proper contact without breaking sparks to be obtained. Owing to the friability of the graphite-copper masses, sticking of the disc 57 on these masses forming contact studs is avoided.

By holding the carriage motionless at a predetermined point of its stroke, the same machine may be used for cutting steel cables, flexible wires, tubes, bars, conductors, by mere fusion of the portion defined by the jaws.

Minor constructional details may be varied without departing from the scope of the invention.

What is claimed is:

1. In a universal machine of the type set forth, jaws each including a base element and a cover element hingedly interconnected, locking means for holding the cover element in closed position, matching semi-cylindrical recesses in the base element and cover element, interchangeable half bushings having an inner curvature matching the outer curvature of the cable to be welded and removably engageable into the recesses, a centering stud carried by the bushing engageable into the base element, a blind hole in the base element recess for receiving the stud, a screwthreaded rod carried by the bushing engageable into the cover element recess, and a bore through the cover element for said rod so as to hold the last-named bushing in the cover element recess.

2. In a universal machine of the type set forth, jaws each including a base element and a cover element hinged to each other, locking means for holding the cover element in closed position, a semi-cylindrical transverse recess in the base element, an interchangeable half bushing having a cable-matching inner curvature and engageable into said recess, a centering stud carried by said bushing, a hole in the recess wall for receiving the stud, a transverse recess of rectangular cross-section in the cover element, a prism-shaped element housed in the recess, the edge of this prism element being directed towards the inside of the jaw, a screw-threaded rod carried by said prism element, a bore through the cover element for receiving said rod, and a nut screwed upon the rod for holding the prism in the cover element recess.

3. In a universal machine of the type set forth, jaws each including a base element and a cover element hinged to each other, locking means for holding the cover element in closed position, matching recesses in the base and cover elements, a solid element housed in the base element recess for receiving a flat element to be welded, a half bushing engaged in the cover element recess, centering studs carried by the bushing and solid element, and holes for receiving the studs formed in the base and cover elements.

4. In a universal machine of the type set forth having conducting jaws, current supply means, terminal members secured to the jaws, terminal members secured to the current supply means, said terminal members having cable receiving recesses therein, cables having one of their ends positioned in the recesses of one of the terminal members of the jaw and their other ends positioned in the recesses of the current supply terminal member, and fusible metal in said recesses bonding the cables to said terminal members.

5. A method for butt-welding metal lugs, each formed with an angle member and a stump member, to the end of metal cables, conductors or like members comprising the steps of clamping the end portion of the cable and the angle member of the metal lug in relatively movable jaws in such a position that the stump member of said metal lug will be directed towards the cable, engaging one end of a protective sleeve upon the cable end and the end portion of the lug into the other end of said sleeve, and causing a welding current to flow through the jaws while driving the jaws towards each other.

6. A method for butt-welding metal lugs, each formed with an angle member and a stump member, to the end of metal cables, conductors or like members, comprising the steps of clamping the end portion of the cable and the angle member of the metal lug in relatively movable jaws, the end portion of the lug being directed towards the cable, engaging a two-part protective sleeve provided with a hole over the end portions of the cable and the metal lug, causing a welding current to flow through the end portion of said cable and the metal lug while driving the jaws towards each other until fused metal is repelled back through the hole of the protective sleeve, removing the sleeve from the cable end portion and cutting away the bead of metal formed by the fused metal repelled back through said hole.

7. A universal machine for butt-welding, end-shaping or cutting off leads, cables, tubes or like articles by a prolonged heating action comprising a switch and a transformer, said switch being inserted in the primary winding of the transformer and having a contact member, a slidable spindle carrying said contact member, a control member, two contact masses, sockets for receiving said masses, screw-threaded bars fixed upon the sockets and forming terminals, and spring means normally urging said contact member from said masses, said contact member being made of copper and the contact masses being made of graphite-copper, so as to prevent arcing between said contacts when closing or opening the circuit for the primary winding of the transformer.

References Cited in the file of this patent

UNITED STATES PATENTS

| Number | Name | Date |
| --- | --- | --- |
| 458,176 | Lemp | Aug. 25, 1891 |
| 804,045 | Rietzel | Nov. 7, 1905 |
| 994,908 | Cleveland | June 13, 1911 |
| 1,867,028 | Phelps | July 12, 1932 |
| 2,008,786 | Febrey | July 23, 1935 |
| 2,387,067 | Heath et al. | Oct. 16, 1945 |
| 2,454,295 | Verkuil | Nov. 23, 1948 |
| 2,526,061 | Batcheller | Oct. 17, 1950 |
| 2,535,397 | Duch et al. | Dec. 26, 1950 |